United States Patent
Krizan et al.

(10) Patent No.: US 11,575,285 B2
(45) Date of Patent: Feb. 7, 2023

(54) ELECTRIC MACHINE

(71) Applicant: FORD GLOBAL TECHNOLOGIES, LLC, Dearborn, MI (US)

(72) Inventors: Jacob Krizan, Farmington Hills, MI (US); Adeeb Ahmed, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 170 days.

(21) Appl. No.: 17/115,949

(22) Filed: Dec. 9, 2020

(65) Prior Publication Data
US 2022/0181927 A1    Jun. 9, 2022

(51) Int. Cl.
| *H02K 1/27* | (2022.01) |
| *H02K 1/276* | (2022.01) |
| *H02K 21/14* | (2006.01) |
| *H02K 29/03* | (2006.01) |

(52) U.S. Cl.
CPC ............. *H02K 1/276* (2013.01); *H02K 21/14* (2013.01); *H02K 29/03* (2013.01)

(58) Field of Classification Search
CPC ........ H02K 1/27; H02K 1/276; H02K 1/2766; H02K 9/03; H02K 15/024; H02K 21/14; H02K 29/03
USPC ...................... 310/156.53, 156.56, 156.57, 4
See application file for complete search history.

(56) References Cited

U.S. PATENT DOCUMENTS

| 5,508,576 | A | * | 4/1996 | Nagate | H02K 9/225 310/64 |
| 6,034,459 | A | * | 3/2000 | Matsunobu | B60L 15/20 310/156.53 |
| 6,133,662 | A | * | 10/2000 | Matsunobu | H02K 1/278 310/156.53 |
| 6,486,581 | B2 | * | 11/2002 | Miyashita | H02K 21/14 310/156.01 |
| 6,525,442 | B2 | * | 2/2003 | Koharagi | H02K 1/2766 310/156.56 |
| 6,597,079 | B2 | * | 7/2003 | Miyashita | H02K 1/276 310/156.48 |
| 6,867,526 | B2 | * | 3/2005 | Mori | H02K 1/2766 310/156.57 |
| 6,917,133 | B2 | * | 7/2005 | Koharagi | H02K 21/16 310/156.56 |
| 7,119,507 | B2 | * | 10/2006 | Nishijima | H02K 1/276 318/632 |

(Continued)

FOREIGN PATENT DOCUMENTS

CN    102355072 A    2/2012
WO    2020092647 A1    5/2020

*Primary Examiner* — Maged M Almawri
(74) *Attorney, Agent, or Firm* — David B Kelley; Brooks Kushman P.C.

(57) ABSTRACT

An electric machine includes a stator and a rotor. The stator defines a central orifice and has an inner diameter. The rotor has an outer diameter and is disposed within the stator. An airgap is defined between inner diameter and the outer diameter. The rotor defines a plurality of cavities. The rotor has magnets disposed within each of the cavities. The magnets define a plurality of pole arc angles. Each pole arc angle is centered about a D-axis. The rotor has an outer periphery. The outer periphery forms smooth spline curves positioned within each pole arc angle. The smooth spline curves deviate radially inward relative to the outer diameter.

15 Claims, 3 Drawing Sheets

(56) References Cited

U.S. PATENT DOCUMENTS

| | | | | |
|---|---|---|---|---|
| 7,151,335 B2* | 12/2006 | Tajima | ................... | B60L 50/66 |
| | | | | 310/156.56 |
| 7,230,359 B2* | 6/2007 | Iles-Klumpner | ....... | H02K 1/276 |
| | | | | 310/156.56 |
| 7,327,062 B2* | 2/2008 | Kaneko | ................. | H02K 1/276 |
| | | | | 310/156.53 |
| 7,605,510 B2* | 10/2009 | Okuma | ................ | H02K 1/2766 |
| | | | | 310/156.56 |
| 7,612,480 B2* | 11/2009 | Fujii | .................... | H02K 1/2766 |
| | | | | 310/156.56 |
| 7,808,143 B2* | 10/2010 | Lee | ..................... | H02K 1/2766 |
| | | | | 310/156.56 |
| 7,843,101 B2* | 11/2010 | Ito | ............................ | H02K 1/28 |
| | | | | 417/423.1 |
| 8,179,011 B2* | 5/2012 | Takemoto | ............. | H02K 21/16 |
| | | | | 310/156.53 |
| 8,193,672 B2* | 6/2012 | Oh | ........................ | H02K 1/276 |
| | | | | 310/216.106 |
| 8,368,273 B2* | 2/2013 | Hino | ....................... | B60L 50/61 |
| | | | | 310/156.47 |
| 8,405,270 B2* | 3/2013 | Li | ........................ | H02K 1/276 |
| | | | | 310/156.53 |
| 8,643,239 B2* | 2/2014 | Takemoto | ............. | H02K 1/276 |
| | | | | 310/156.45 |
| 8,659,200 B2* | 2/2014 | Adaniya | ................ | H02K 21/16 |
| | | | | 310/156.57 |
| 9,077,224 B2* | 7/2015 | Morishita | ............. | H02K 1/2766 |
| 9,236,775 B2* | 1/2016 | Takahashi | ............... | H02K 21/14 |
| 9,893,580 B2* | 2/2018 | Soma | .................. | H02K 1/276 |
| 9,985,484 B2* | 5/2018 | Liang | .................. | H02K 1/2766 |
| 10,958,120 B2* | 3/2021 | Tang | .................. | H02K 1/2766 |
| 2001/0028201 A1* | 10/2001 | Miyashita | ............. | H02K 21/16 |
| | | | | 310/254.1 |
| 2002/0047432 A1* | 4/2002 | Miyashita | ............. | H02K 21/14 |
| | | | | 310/156.48 |
| 2002/0047434 A1* | 4/2002 | Koharagi | ............... | H02K 21/16 |
| | | | | 310/156.56 |
| 2002/0171309 A1* | 11/2002 | Wakui | .................. | H02K 1/2766 |
| | | | | 310/156.48 |
| 2003/0178905 A1* | 9/2003 | Koharagi | ............... | H02K 1/2766 |
| | | | | 310/156.38 |
| 2003/0222526 A1* | 12/2003 | Matsunobu | ............ | H02K 29/03 |
| | | | | 310/156.56 |
| 2004/0017123 A1* | 1/2004 | Miyashita | .............. | H02K 1/276 |
| | | | | 310/156.53 |
| 2005/0168089 A1* | 8/2005 | Miyashita | ............. | H02K 29/03 |
| | | | | 310/156.57 |
| 2005/0200223 A1* | 9/2005 | Tajima | ................. | H02K 1/2766 |
| | | | | 310/156.55 |
| 2007/0085436 A1* | 4/2007 | Tajima | ................... | B60L 50/66 |
| | | | | 310/156.56 |
| 2007/0126305 A1* | 6/2007 | Okuma | ................ | H02K 1/2766 |
| | | | | 310/156.53 |
| 2007/0200447 A1* | 8/2007 | Adaniya | ................ | H02K 29/03 |
| | | | | 310/156.53 |
| 2008/0203842 A1* | 8/2008 | Yoshikawa | ............ | H02K 1/276 |
| | | | | 310/156.01 |
| 2010/0194228 A1* | 8/2010 | Lee | ........................ | H02K 29/03 |
| | | | | 310/156.53 |
| 2010/0213780 A1* | 8/2010 | Lee | ...................... | H02K 1/2766 |
| | | | | 310/156.53 |
| 2011/0133590 A1* | 6/2011 | Lokhandwalla | ...... | H02K 1/2766 |
| | | | | 310/156.53 |
| 2012/0019089 A1* | 1/2012 | Takemoto | .............. | H02K 1/276 |
| | | | | 310/156.54 |
| 2012/0139378 A1* | 6/2012 | Endo | ...................... | H02K 15/03 |
| | | | | 29/598 |
| 2012/0139386 A1* | 6/2012 | Murakami | ............ | H02K 1/146 |
| | | | | 310/216.092 |
| 2013/0270958 A1* | 10/2013 | Takahashi | .............. | H02K 1/274 |
| | | | | 310/156.38 |
| 2014/0217849 A1* | 8/2014 | Soma | ................... | H02K 1/2766 |
| | | | | 310/156.53 |
| 2014/0361646 A1* | 12/2014 | Saito | ..................... | B60L 15/007 |
| | | | | 310/51 |
| 2015/0069874 A1* | 3/2015 | Iki | ......................... | H02K 1/274 |
| | | | | 310/156.11 |
| 2015/0256038 A1* | 9/2015 | Nigo | ..................... | F25B 31/026 |
| | | | | 310/156.57 |
| 2015/0380996 A1* | 12/2015 | Kim | ....................... | H02K 1/2773 |
| | | | | 310/156.56 |
| 2016/0365762 A1* | 12/2016 | Liang | ................... | H02K 1/2706 |
| 2017/0104376 A1* | 4/2017 | Nakagawa | ........... | H02K 1/2773 |
| 2017/0373550 A1* | 12/2017 | Soma | ................... | H02K 1/2766 |
| 2018/0309333 A1* | 10/2018 | Makino | .................... | H02K 1/27 |
| 2019/0089214 A1* | 3/2019 | Tang | ................... | H02K 1/2766 |
| 2021/0184520 A1* | 6/2021 | Zhang | ..................... | H02K 1/24 |

* cited by examiner

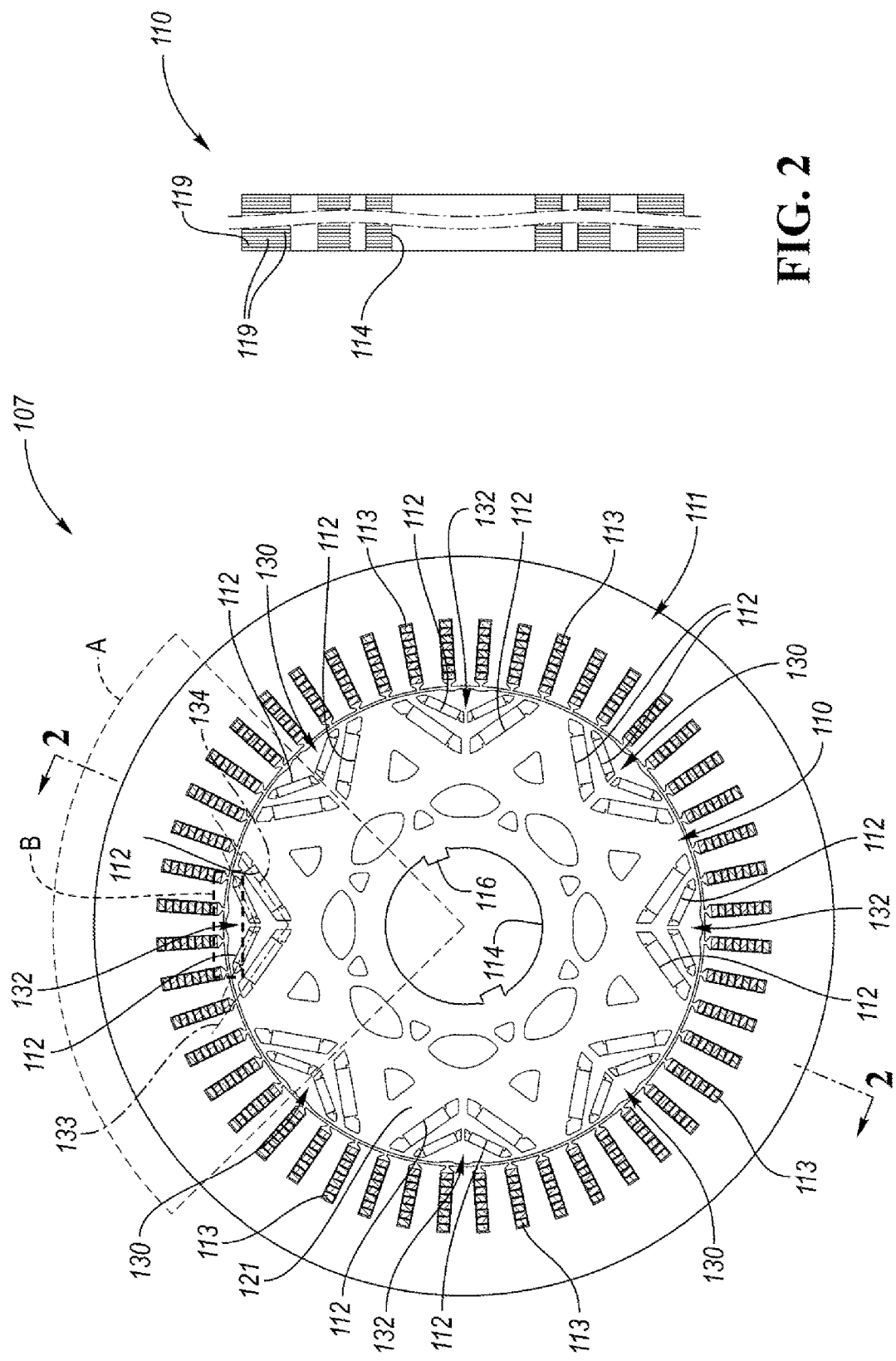

ELECTRIC MACHINE

TECHNICAL FIELD

The present disclosure relates to a rotor for a permanent magnet electric machine.

BACKGROUND

Electric machines typically employ a rotor and stator to produce torque. Electric current flows through the stator windings to produce a magnetic field. The magnetic field generated by the stator may cooperate with permanent magnets within the rotor to generate torque.

SUMMARY

An electric machine includes a stator and a rotor. The stator defines a central orifice and has an inner diameter. The rotor has an outer diameter and is disposed within the stator. An airgap is defined between inner diameter and the outer diameter. The rotor defines a plurality of cavities. The rotor has magnets disposed within each of the cavities. The magnets define a plurality of pole arc angles. Each pole arc angle is centered about a D-axis. The rotor has an outer periphery. The outer periphery forms smooth spline curves positioned within each pole arc angle. The smooth spline curves deviate radially inward relative to the outer diameter.

An electric machine rotor includes a core and magnets. The core has an outer periphery and defines pairs of V-shaped cavities. The magnets are disposed within each of the cavities. Radial outermost corners of the magnets within each pair of V-shaped cavities define a pole arc angle centered about a D-axis. The outer periphery of the core forms smooth spline curves within each pole arc angle that deviate radially inward relative to an outermost diameter of the core. A shape of each smooth spline curve is symmetrical about a respective D-axis. The shape is based on control points that are functions of an air gap between the rotor and a stator and the pole arc angles.

An electric machine rotor includes a core and magnets. The core has an outer periphery and defines cavities. The magnets are disposed within each of the cavities. The magnets define pole arc angles that are each centered about a D-axis. The outer periphery of the core forms smooth spline curves within each pole arc angle that deviate radially inward relative to an outermost diameter of the core. The shape of each smooth spline curve includes first and second radially outward extending protrusions that are spaced apart by a first radially inward extending notch and that are sandwiched between second and third radially inward extending notches. The shape is based on control points that are functions of an air gap between the rotor and a stator and the pole arc angles. The control points include a low point within the first radially inward extending notch, a peak of the first protrusion, a first point positioned within the second radially inward extending notch, a second point positioned within the second radially inward extending notch, and a point at an outer edge of the respective pole arc angle.

BRIEF DESCRIPTION OF THE DRAWINGS

FIG. 1 is a plan view of a first embodiment of a rotor and a stator of an electric machine;

FIG. 2 is a cross-sectional view taken along line 2-2 of FIG. 1 of a rotor section comprised of a stack of laminations;

DETAILED DESCRIPTION

Figure 3:
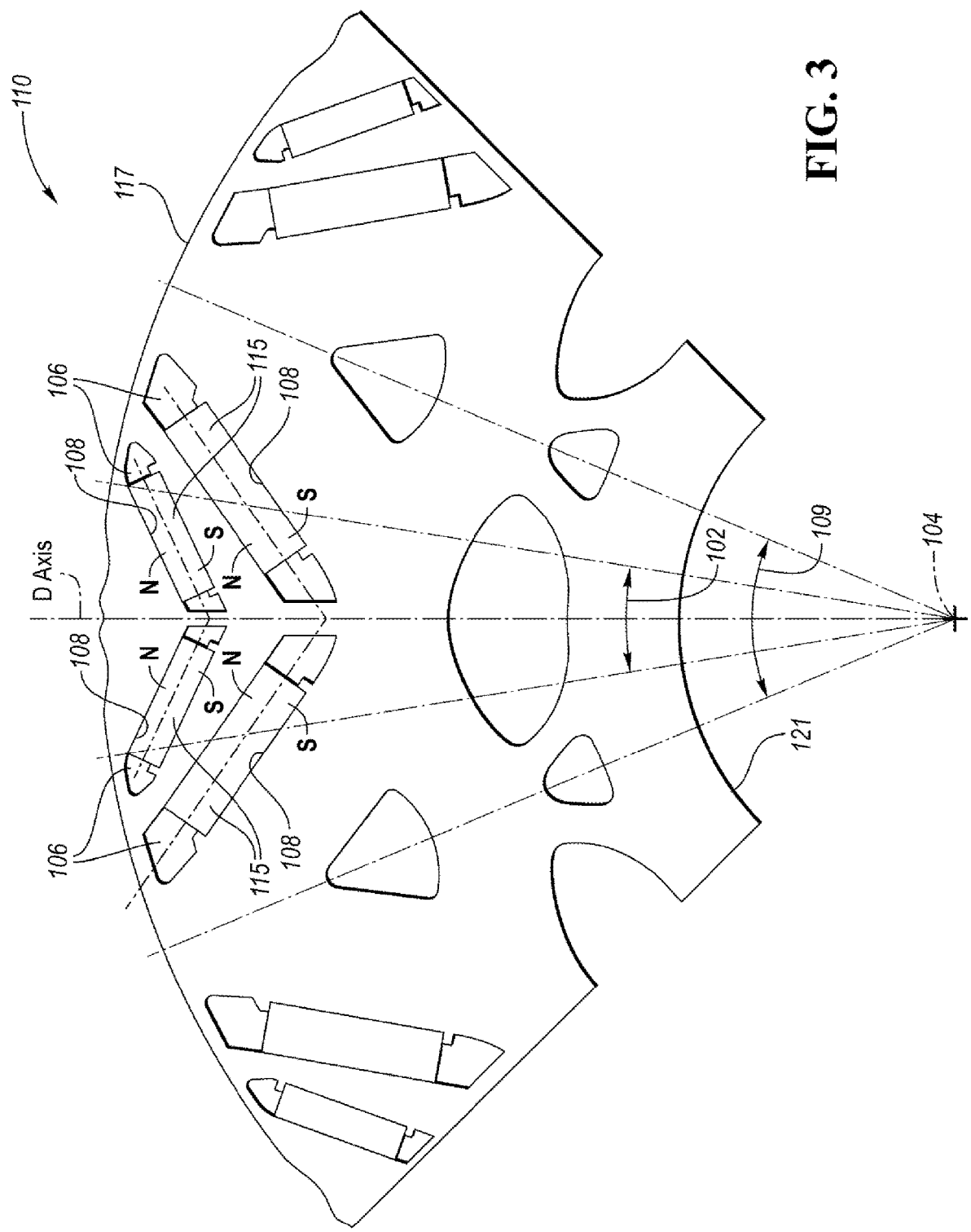
FIG. 3 is a plan view of a section of the rotor comprising area A from FIG. 1.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Electric machines may be characterized by an undesirable oscillation in torque, which is caused by harmonics present in the airgap flux and in the airgap permeance. This torque ripple is caused by harmonics that can be substantially mitigated through proper rotor design. Permanent magnets may be positioned or oriented about the rotor of the electric machine in different ways to generate desirable magnetic fields. Each of the poles may be formed by a single permanent magnet oriented with one pole (i.e., north or south) in the radially outward direction. The poles of the rotor may be formed by groups of permanent magnets arranged to cooperatively form magnetic poles. One such arrangement orients the magnets in a V-shaped pattern. The interior portion of the "V" has similar magnetic poles that cooperate to form a magnetic pole of the rotor. An 8-pole rotor includes eight V-shaped patterns disposed about the rotor and spaced by 45°. Each of the permanent magnets may be disposed in pockets or cavities to retain the permanent magnets. These pockets or cavities are typically rectangular and sized to receive the permanent magnets. The pockets may also include cavities that extend at opposite ends of the pockets and beyond the permanent magnets to limit magnetic flux leakage between north and south poles of the individual permanent magnets. The portions of the pockets or cavities that receive the permanent magnets may be referred to as permanent magnet pockets or cavities. The extended portions of the pockets may be referred to as magnetic field guide pockets, cavities, or chambers or may be referred to as magnetic field forming pockets, cavities, or chambers. Voids or cavities in the rotor core impede magnetic flux because a vacuum has a relatively low magnetic permeability compared to the rotor core material (e.g., electric steel).

The magnetic field guide chambers associated with each of the pockets may adjust the pole arc angle of the magnetic pole. Each of the magnetic poles of an eight pole rotor is designated in a 45° portion of the rotor lamination. This 45° portion is referred to as a mechanical pole pitch. Instead of allowing all of the magnetic poles to have an arc angle of 45°, the field forming chambers may be defined to guide the flux from each pole by reducing or widening the arc angle.

The resulting arc angle from each of the poles may still accumulate to cover the entire 360° outer peripheral surface of the rotor or cover less than the entire outer peripheral surface of the rotor.

The rotor may be comprised of a plurality of laminations or laminated plates that are sequentially stacked in an axial direction along an axis of rotation of the rotor of the electric machine. The laminations are individually fabricated from a material such iron or steel. The laminations are then aligned in an axial direction (i.e., along the axis of rotation of the rotor) to form the rotor or the electric machine. The laminations may be stacked "loose", welded, or bonded together depending the desired application. The laminations may include a thin layer of insulating material (e.g., a thin layer of epoxy that is approximately 0.001 mm thick). There may or may not be small spaces between adjacent laminations at locations where the adjacent laminations are not affixed to each other, if the application requires the adjacent laminations to be affixed to each other (i.e., via welding or bonding).

Referring now to FIG. 1, an electric machine 107 having a rotor 110 and a stator 111 is shown. The rotor 110 is disposed within the stator 111. The stator includes windings 113. The windings 113 are shown as cross-sections in FIG. 1 for simplification purposes. The rotor 110 may be comprised of a core 121 that includes plurality of stacked laminations 119. The rotor 110 (or more specifically the core 121 of the rotor 110) may define a plurality of cavities 112 adapted to hold permanent magnets in pockets. The rotor 110 (or more specifically the core 121 of the rotor 110) may define a circular central opening 114 with a keyway 116 for accommodating a driveshaft that may receive a drive key (not shown). The cavities may be oriented such that the permanent magnets housed in the cavities 112 form eight alternating magnetic poles 130, 132. It is well known in the art that an electric machine may have various numbers of poles. Therefore, this disclosure should not be construed as limited to rotors having exactly eight magnetic poles. The magnetic poles 130 may be configured to be north poles and the magnetic poles 132 may be configured to be south poles, or vice versa. The permanent magnets may also be arranged with different patterns. Therefore, this disclosure should not be construed to as limited to the pattern illustrated herein. As shown in FIG. 1, the cavities 112, which hold permanent magnets, are arranged in pairs that form V-shapes 133. Two pairs of the V-shaped cavities that are centered about a D-axis form each magnetic pole (i.e., poles 130 and 132). Referring now to FIG. 2, a plurality of laminations 119 may form the rotor 110 or a section of the rotor 110.

Referring now to FIG. 3, the section comprising area A from FIG. 1 is shown having a particular pole arc angle 102. Each pole has a pole arc angle 102 that may be centered about a respective D-axis of the pole. As shown, the pole arc angle 102 is measured as the angle between points on the outer periphery 117 of the rotor 110 (the outer periphery 117 may more specifically be the outer periphery of the core 121 of the rotor 110) that are directly radially aligned with inner corners of the most radially outward portions of permanent magnets 115 that are disposed within the radially outermost V-shaped pair of cavities that form each magnetic pole (i.e., poles 130 and 132), where the vertex of the pole arc angle 102 is the central axis 104 of the rotor 110. The pole arc angle 102, however, can be measured using a variety of methods. For example, the Pole arc angle 102 may be measured as the angle between points on the outer periphery 117 of the rotor 110 that are directly radially aligned with inner corners of the most radially outward portions of permanent magnets 115 that are disposed within the radially innermost V-shaped pair of cavities that form each magnetic pole, where the vertex of the pole arc angle 102 is the central axis 104 of the rotor 110. Other examples may include measuring the pole arc angle 102 as the angle between points on the outer periphery 117 of the rotor 110 that are directly radially aligned with outer corners of the most radially outward portions of the permanent magnets 115, inner corners of the most radially inward portions of the permanent magnets 115, or outer corners of the most radially inward portions of permanent magnets 115 that are disposed within either pair of V-shaped cavities, where the vertex of the pole arc angle 102 is the central axis 104 of the rotor 110.

Alternatively, the pole arc angle may be shaped by the angle of the magnetic field guide chambers 106 (i.e., the portions of the cavities 112 that are not filled with the permanent magnets 115) relative to the magnet pockets 108 (i.e., the portions of the cavities 112 that are filled with the permanent magnets 115). The rotor 110 may have a mechanical pole pitch 109 of 45°, as shown. The pole arc angle 102 may be measured as the angle between the most distinguished inner corner of the most radially outward portion of magnetic field guide chambers 106, where the vertex of the pole arc angle 102 is the central axis 104 of the rotor 110. The pole arc angle 102 can also be measured from the outermost edges of the magnetic field guide chambers 106, the inner edges of the magnetic field guide chambers 106, or a hypothetical center of gravity (e.g., if the chamber was filled with a material, the center of gravity of that material). The pole arc angle 102 can also be measured as an angle between the permanent magnet pockets 108 and magnetic field guide chambers 106.

The pole arc angle 102 may also be measured using the length of the arc across the outer periphery of the rotor to define a surface. The surface may be defined by the length of the arc having a threshold magnitude of magnetic flux. For example, the shape of the features, chambers, may make it difficult to ascertain a generic definition and value for the pole arc angle. Under these circumstances, the magnetic flux crossing the arc length or surface may be measured or estimated to determine the formed magnetic field. Measuring the result of the field-forming chamber may provide an improved indication of the desired pole arc angle instead of measuring the angle directly. This additional method may indirectly provide a comparison between the pole arc angles of the adjacent sections to determine whether magnetic skewing is used to reduce torque ripple.

The vertex for the angle may be determined as an intersection of an extension of the V-shaped permanent magnet pockets, an extension of the chambers, or a combination thereof. The vertex of the pole arc angle may also be the centroid of the section or lamination or the axis of rotation of the rotor. Other features (e.g., holes, cavities) generally included on rotor laminations to control magnetic fields may be included or not included to properly form magnetic fields in the air gap.

Figure 4:
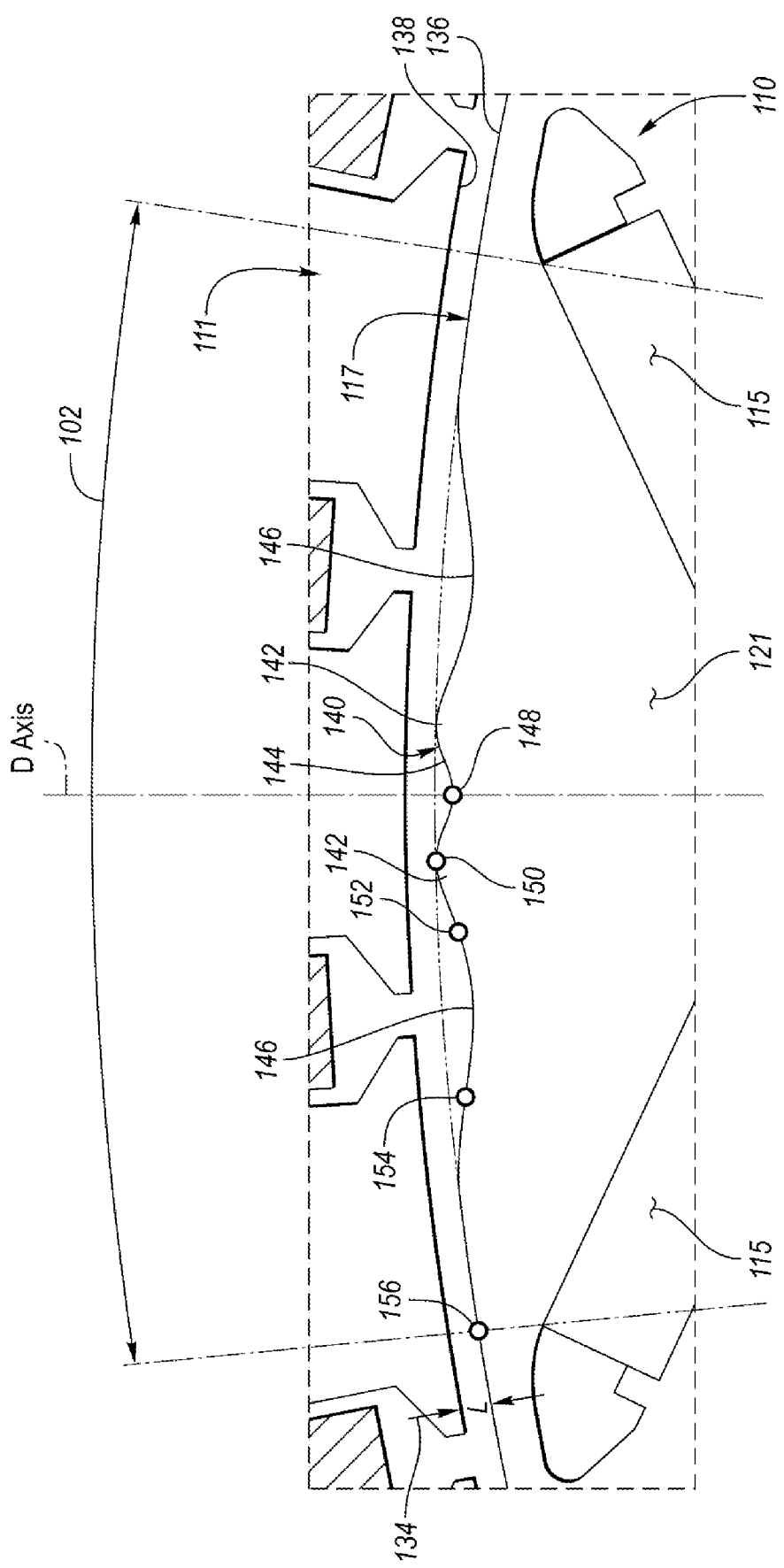
FIG. 4 is a plan view of a section of the electric machine comprising area B from FIG. 1.

Referring now to FIG. 4, a plan view of a section of the electric machine 107 comprising area B from FIG. 1 is illustrated. An airgap 134 having a length L is defined between an outer diameter 136 of the rotor 110 (the outer diameter 136 may more specifically be the outer diameter 136 of the core 121 of the rotor 110) and an inner diameter 138 of the stator 111. The outer periphery 117 of the rotor 110 forms smooth spline curves 140. The smooth splines curves 140 are positioned within each of the pole arc angles 102. The smooth spline curves 140 deviate radially inward relative to the outer diameter 136 of the rotor 110. The shapes of the smooth spline curves 140 are based on control points that are functions of the air gap 134 and the pole arc angle 102. Each of the smooth spline curves 140 may be symmetrical within a respective pole arc angle 102 about a respective D-axis. The smooth spline curves 140 may form first and second radially outward extending hills or protrusions 142 that are spaced apart by a first radially inward extending valley or notch 144. The first and second radially outward extending protrusions 142 may also be sandwiched between second and third radially inward extending valleys or notches 146.

A spline curve is a mathematical representation for which it is easy to build an interface that will allow a user to design and control the shape of complex curves and surfaces. The general approach is that the user enters a sequence of points (control points), and a curve is constructed whose shape closely follows this sequence. The term spline may refer to a piecewise polynomial (parametric) curve. A smooth curve is a curve which is a smooth function that has continuous derivatives and no sharp corners.

A first control point 148, a second control point 150, a third control point 152, a fourth control point 154, and a fifth control point 156 may be utilized to form the shape of each of the smooth spline curves 140.

The first control point 148 may be a low point within the first radially inward extending notch 144. The first control point 148 may be positioned on a respective D-axis and may be positioned radially inward relative to the outer diameter 136 of the rotor 110 at a distance that ranges between 25% and 75% of the length L of the airgap 134.

The second control point 150 may be a peak of the first protrusion 142. The second control point 150 may be positioned radially inward relative to the outer diameter 136 of the rotor 110 at a distance that ranges between zero and 25% of the length L of the airgap 134. The second control point 150 may also be positioned at an angle that ranges between 1% and 7.5% of the pole arc angle 102 from the respective D-axis, where the vertex of the angle may be the central axis 104 of the rotor 110.

The third control point 152 may be a first point positioned within the second radially inward extending notch 146. The third control point 152 may be positioned radially inward relative to the outer diameter 136 of the rotor 110 at a distance that ranges between 25% and 75% of the length L of the airgap 134. The third control point 152 may also be positioned at an angle that ranges between 7.5% and 20% of the pole arc angle 102 from the respective D-axis, where the vertex of the angle may be the central axis 104 of the rotor 110.

The fourth control point 154 may be a second point positioned within the second radially inward extending notch 146. The fourth control point 154 may be positioned radially inward relative to the outer diameter 136 of the rotor 110 at a distance that ranges between 10% and 50% of the length L of the airgap 134. The fourth control point 154 may also be positioned at an angle that ranges between 20% and 45% of the pole arc angle 102 from the respective D-axis, where the vertex of the angle may be the central axis 104 of the rotor 110.

The fifth control point 156 may be a point positioned within a radially outer region or at an outer edge of the respective pole arc angle 102. The fifth control point 156 may be positioned radially inward relative to the outer diameter 136 of the rotor 110 at a distance that ranges between zero and 15% of the length L of the airgap 134. The fifth control point 156 may also be positioned at an angle that is 50% of the pole arc angle 102 from the respective D-axis, where the vertex of the angle may be the central axis 104 of the rotor 110.

The unique shape of the spline curves 140 provide harmonic cancellation providing reductions of torque ripple and radial force. The five controls points 148, 150, 152, 154, and 156 are adjusted relative to the circular arc (i.e., the outer diameter 136) of a rotor that does not include any deviation from the outer diameter. During testing the design that include splines shape as described herein (i.e., splines 140) relative to the rotor that does not include any deviation from the outer diameter, showed a 52.8% reduction of $6^{th}$ order torque ripple and a 32.3% reduction of $6^{th}$ order radial force ripple at 100 Nm with only a 1.1% reduction of maximum torque. The continuous control of the rotor 110 surface (i.e., the adjustments of the rotor surface to include splines 140) allows a variable airgap length between the rotor 110 and the stator 111 that is tunable to cancel out the discrete effects of the slots and windings within the slots of the stator 111. The spline 140 is nominally symmetrical by repeating at each D-axis resulting in a similar harmonic canceling performance in either torque direction.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:
1. An electric machine comprising:
  a stator defining a central orifice and having an inner diameter; and
  a rotor having an outer diameter and disposed within the stator, wherein an airgap is defined between inner diameter and the outer diameter, the rotor
    defining a plurality of cavities,
    having magnets disposed within each of the cavities, the magnets defining a plurality of pole arc angles, wherein each pole arc angle is centered about a D-axis, and
    having an outer periphery, the outer periphery forming smooth spline curves positioned within each pole arc angle, wherein (i) the smooth spline curves deviate radially inward relative to the outer diameter, (ii) shapes of the smooth spline curves are based on control points that are functions of the air gap and the pole arc angle, (iii) each of the smooth spline curves are symmetrical within a respective pole arc angle about a respective D-axis, (iv) each of the smooth spline curves form first and second radially outward extending protrusions that are spaced apart by a first radially inward extending notch and are sandwiched between second and third radially inward extending notches, (v) a first of the control points of each of the smooth spline curves is a low point within the first radially inward extending notch and is positioned on the respective D-axis, and (vi) a second of the control points of each of the smooth spline curves is a peak of the first protrusion.

2. The electric machine of claim 1, wherein the first of the control points of each of the smooth spline curves is positioned radially inward relative to the outer diameter at a distance that ranges between 25% and 75% of a length of the airgap.

3. The electric machine of claim 1, wherein the second of the control points of each of the smooth spline curves is positioned radially inward relative to the outer diameter at a distance that ranges between zero and 25% of a length of the airgap.

4. The electric machine of claim 1, wherein the second of the control points of each of the smooth spline curves is positioned at an angle that ranges between 1% and 7.5% of the pole arc angle from the respective D-axis.

5. The electric machine of claim 1, wherein a third of the control points of each of the smooth spline curves is positioned within the second radially inward extending notch.

6. The electric machine of claim 5, wherein the third of the control points of each of the smooth spline curves is positioned radially inward relative to the outer diameter at a distance that ranges between 25% and 75% of a length of the airgap.

7. The electric machine of claim 5, wherein the third of the control points of each of the smooth spline curves is positioned at an angle that ranges between 7.5% and 20% of the pole arc angle from the respective D-axis.

8. The electric machine of claim 5, wherein a fourth of the control points of each of the smooth spline curves is positioned within the second radially inward extending notch.

9. The electric machine of claim 8, wherein the fourth of the control points of each of the smooth spline curves is positioned radially inward relative to the outer diameter at a distance that ranges between 10% and 50% of a length of the airgap.

10. The electric machine of claim 8, wherein the fourth of the control points of each of the smooth spline curves is positioned at an angle that ranges between 20% and 45% of the pole arc angle from the respective D-axis.

11. The electric machine of claim 8, wherein a fifth of the control points of each of the smooth spline curves is positioned at an outer region of the respective pole arc angle.

12. The electric machine of claim 11, wherein the fifth of the control points of each of the smooth spline curves is positioned radially inward relative to the outer diameter at a distance that ranges between zero and 15% of a length of the airgap.

13. The electric machine of claim 11, wherein the fifth of the control points of each of the smooth spline curves is positioned at an angle that is 50% of the pole arc angle from the respective D-axis.

14. An electric machine rotor comprising:
a core having an outer periphery and defining pairs of V-shaped cavities; and
magnets disposed within each of the cavities, wherein
radial outermost corners of the magnets within each pair of V-shaped cavities define a pole arc angle centered about a D-axis,
the outer periphery of the core forms smooth spline curves within each pole arc angle that deviate radially inward relative to an outermost diameter of the core,
a shape of each smooth spline curve is symmetrical about a respective D-axis,
the shape is based on control points that are functions of an air gap between the rotor and a stator and the pole arc angles,
the shape includes first and second radially outward extending protrusions that are spaced apart by a first radially inward extending notch and that are sandwiched between a second and third radially inward extending notches,
a first of the control points of each smooth spline curve is a low point within the first radially inward extending notch and is positioned on the respective D-axis, and
a second of the control points of each of the smooth spline curves is a peak of the first protrusion.

15. An electric machine rotor comprising:
a core having an outer periphery and defining cavities; and
magnets disposed within each of the cavities, wherein
the magnets define pole arc angles centered about a D-axis,
the outer periphery of the core forms smooth spline curves within each pole arc angle, wherein each smooth spline curve is (i) symmetrical within a respective pole arc angle about a respective D-axis and (ii) deviates radially inward relative to an outermost diameter of the core,
a shape of each smooth spline curve includes first and second radially outward extending protrusions that are spaced apart by a first radially inward extending notch and that are sandwiched between a second and a third radially inward extending notches,
the shape is based on control points that are functions of an air gap between the rotor and a stator and the pole arc angles, and
the control points include (i) a low point within the first radially inward extending notch that is positioned on the respective D-axis, (ii) a peak of the first protrusion, (iii) a first point positioned within the second radially inward extending notch, (iv) a second point positioned within the second radially inward extending notch, and (v) a point at an outer edge of the respective pole arc angle.

* * * * *